Nov. 7, 1933.  R. B. FAGEOL  1,933,667
TANDEM AXLE DRIVE
Filed Sept. 25, 1923  2 Sheets-Sheet 1
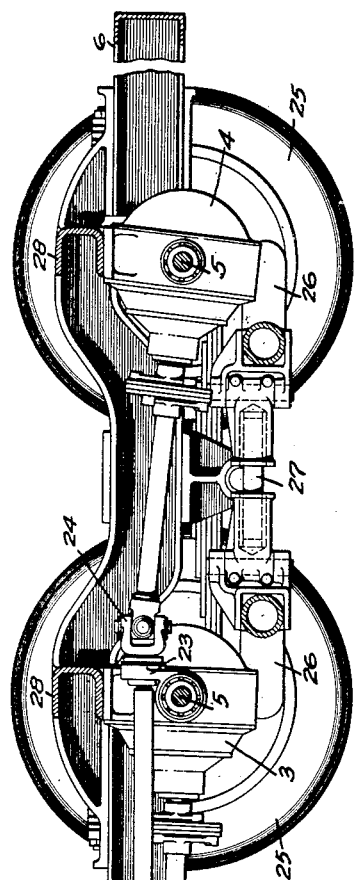
FIG. 1.
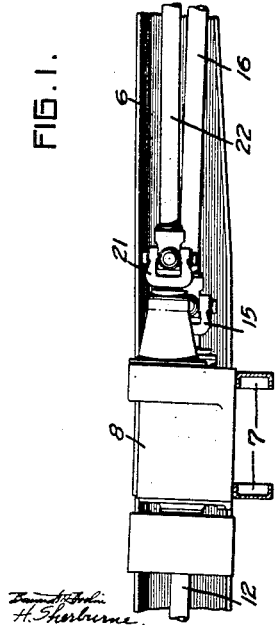
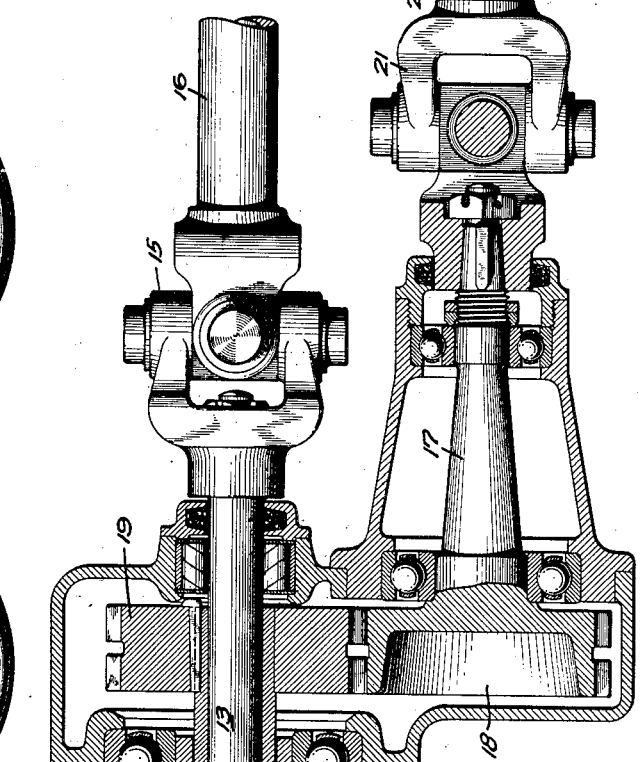
FIG. 2.
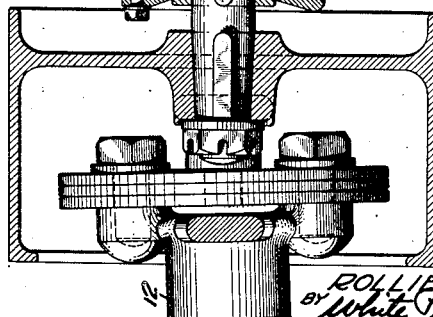
INVENTOR
ROLLIE B. FAGEOL
BY White Prost & Evans
his ATTORNEYS.

Patented Nov. 7, 1933

1,933,667

UNITED STATES PATENT OFFICE 1,933,667

TANDEM AXLE DRIVE

Rollie B. Fageol, Oakland, Calif., assignor to Eight Wheel Motor Vehicle Company, San Francisco, Calif., a corporation of California Application September 25, 1923
Serial No. 664,803

3 Claims. (Cl. 180—22)

The invention relates to a drive for tandem axles, that is, a pair of axles arranged in spaced relation and parallel with each other.

An object of the invention is to provide means for differentially driving the two axles.

Another object of the invention is to provide a drive for a tandem axle in which each axle is driven by an independent drive shaft, the two drive shafts being differentially driven from a propeller shaft.

A further object of the invention is to provide a differentially driven tandem axle, in which there is substantially no relative movement between the differential gear and the axle.

The invention possesses other advantageous features, some of which, with the foregoing, will be set forth at length in the following description, where I shall outline in full that form of my invention which I have selected for illustration in the drawings accompanying and forming part of the present specification. In said drawings I have shown one form of tandem axle drive of my invention, but it is to be understood that I do not limit myself to such form, since the invention, as set forth in the claims, may be embodied in a plurality of forms.

Referring to said drawings:

Fig. 1 is a vertical section through the rear end of a vehicle frame provided with a tandem drive axle, portions thereof being broken away to reduce the size of the figure.

Fig. 2 is a horizontal section through the differential housing, showing the propeller shaft and the laterally spaced differentially driven drive shaft.

Figure 3:
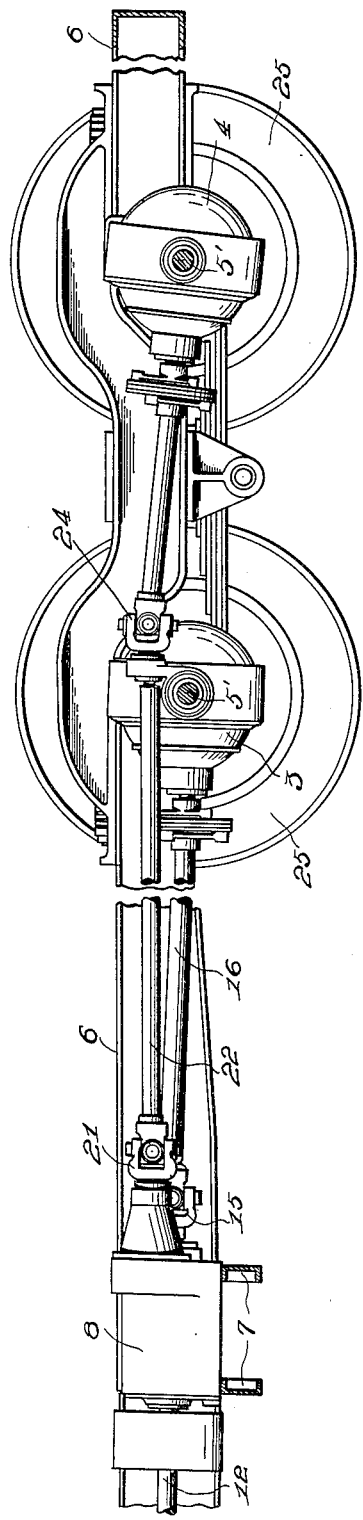
Fig. 3 is a vertical section similar to Fig. 1 but showing a modification.

My invention relates particularly to tandem drive axles and particularly to means for driving both of the axles of the tandem axle differentially. The tandem axle comprises two spaced parallel driving axles and provides a four wheel drive. It is essential that each axle be driven differentially with respect to the other and that the two wheels of each axle be driven differentially with respect to each other. The tandem axle of my invention comprises the two axle housings 3 and 4 in which are arranged the usual drive gears and differential gears. These differential gears are interposed between the two axle parts which form the complete drive axle. The axle parts 5 extend from the housing to the wheels.

Mounted on the vehicle frame 6 in front of the tandem axle, preferably by means of the cross channels 7 is a differential gear housing 8 which encloses a differential gear 9. The differential gear is driven by the propeller shaft 12 and produces differential driving of the shaft 13 and the sleeve 14. The shaft 13 is connected by means of the universal joint 15 with the drive shaft 16 of the front axle 3. Journaled in the differential housing 8 is a shaft 17 having a gear 18, preferably with herring-bone teeth, arranged on one end thereof. This gear meshes with a like gear 19 secured to the sleeve 14. Connected to the shaft 17 by a universal joint 21 is the drive shaft 22 of the rear axle 4. This drive shaft 22 preferably extends over that portion of the housing 3 of the front axle from which the drive axle 5 extends. The drive shaft 22 is preferably supported intermediate its ends in a bearing 23 secured to the front axle housing 3. Behind the bearing 23 the shaft 22 is provided with a universal joint 24 to permit the shaft to be inclined downwardly to the rear axle 4.

The wheels 25 are journaled on the load carrying axles 26, which are preferably tubular in shape and which are bent downward to pass under the drive axle housings 3 and 4 and which are also bent laterally to remove the central portion of the axle from below the deepest portion of the axle housings 3 and 4. These dead axles or load carrying axles 26 are provided on the ends with bearing blocks through which the drive axles 5 extend to the wheel hubs. The two axles 26 are preferably connected together by a telescopic torque rod 27 which prevents relative rotational movement of the two load carrying axles.

This drive construction may be used in connection with unsprung drive axle housings or may be used in connection with drive axle housings which are secured to the vehicle frame. In Figure 1 I have shown the drive axle housings 3 and 4 secured to the vehicle frame by the channels 28. The load carrying axles are unsprung so that there is a relative movement between the axle housings and the load carrying axle and for this reason the load carrying axle is bent to avoid the axle housing. When this construction is employed the drive axles 5 extending from the axle housings 3 and 4 to the bearing blocks in the ends of the load carrying axles, are provided with universal joints to accommodate the varying relative positions of the drive axle housings and the load carrying axles.

In Figure 3, I have shown the construction above referred to used in connection with unsprung drive axle housings. In this view the housings are carried by the drive axles 5' as is usual in the art to which this invention pertains. As will be apparent to any person skilled in the art, there is no necessity in this form of the invention, for the dead load carrying axles 26 or the cross frame members 28 and 29, shown in Figure 1, since axles 5' themselves serve the function of these members. Accordingly, I have omitted such axles and members from Figure 3.

I claim:—

1. The combination with a vehicle frame, of a pair of drive axle housings, drive axles in said housings, a propeller shaft, a differential gear housing secured to the frame in front of said axles, a differential gear in said housing to which the propeller shaft is connected and two differentially driven drive shafts extending from the differential housing to the respective axles, the drive shaft for the rear axle being supported intermediate its ends on the front axle housing, and embodying a universal joint between said differential gear and said front axle housing.

2. In a dual rear axle drive, a differential mounted upon the chassis, differentials mounted upon the respective rear axles, propeller shafts between the respective rear and the first mentioned differentials, means in the forward rear differential housing providing a journal for the rear propeller shaft and means in the respective propeller shafts for permitting relative movement between the respective differentials.

3. In a dual rear drive for tandem sets of wheels, a differential mounted upon the chassis; a pair of rear axle assemblies including differentials mounted for driving said tandem sets of wheels; propeller shafts between the respective rear differentials and the first mentioned differential; a journal, supported by the foremost rear axle assembly, for that propeller shaft which extends from the differential mounted upon the chassis to the differential included in the rearmost axle assembly; and means in the respective propeller shafts for permitting relative movement between the respective axle assemblies and the first mentioned differential.

ROLLIE B. FAGEOL.